US011178824B2

(12) United States Patent
Heidl et al.

(10) Patent No.: US 11,178,824 B2
(45) Date of Patent: *Nov. 23, 2021

(54) SYSTEM AND METHOD FOR CULTIVATING PLANTS

(71) Applicant: RackREIT, LLC, Denver, CO (US)

(72) Inventors: Jeremy Heidl, Denver, CO (US); Jim Muth, Oconomowoc, WI (US)

(73) Assignee: RACKREIT, LLC, Denver, CO (US)

(*) Notice: Subject to any disclaimer, the term of this patent is extended or adjusted under 35 U.S.C. 154(b) by 625 days.

This patent is subject to a terminal disclaimer.

(21) Appl. No.: 16/160,186

(22) Filed: Oct. 15, 2018

(65) Prior Publication Data
US 2019/0045722 A1 Feb. 14, 2019

Related U.S. Application Data

(63) Continuation of application No. 14/733,173, filed on Jun. 8, 2015, now Pat. No. 10,098,287.

(60) Provisional application No. 62/008,700, filed on Jun. 6, 2014.

(51) Int. Cl.
| A01G 9/02 | (2018.01) |
| A01G 9/24 | (2006.01) |
| A01G 31/06 | (2006.01) |
| A01G 7/04 | (2006.01) |
(Continued)

(52) U.S. Cl.
CPC ............ A01G 9/023 (2013.01); A01G 7/045 (2013.01); A01G 9/022 (2013.01); A01G 9/20 (2013.01); A01G 9/247 (2013.01); A01G 9/249 (2019.05); A01G 27/005 (2013.01);
(Continued)

(58) Field of Classification Search
CPC . A01G 9/023; A01G 9/20; A01G 9/14; A01G 9/025; A01G 9/022; A01G 27/008; F21V 21/005; F21V 21/008; F21V 21/34; F21V 33/0028; F21S 8/066; F21S 8/038
See application file for complete search history.

(56) References Cited

U.S. PATENT DOCUMENTS

| 1,361,625 A | 12/1920 | Schoenfeld |
| 1,550,258 A | 8/1925 | Husted |
| 1,631,488 A | 6/1927 | Jones |
(Continued)

FOREIGN PATENT DOCUMENTS

| CH | 162848 | 7/1933 |
| DE | 19906575 | 9/2000 |
(Continued)

OTHER PUBLICATIONS

Official Action for Australian Patent Application No. 2015269088, dated Jun. 30, 2017, 4 pages.
(Continued)

Primary Examiner — Magdalena Topolski
Assistant Examiner — Morgan T Barlow
(74) Attorney, Agent, or Firm — Sheridan Ross P.C.

(57) ABSTRACT

A system for storing and cultivating plants and enhancing usable area, space or volume is provided. One or more racks are provided for housing plants, such as potted plants, in arrays extending in at least a vertical direction. Lighting is provided to provide ultraviolet and infrared radiation in the system. At least one rack is selectively moveable with respect to at least one lighting element, such that proximity between plants and at least one lighting element may be selectively varied.

20 Claims, 10 Drawing Sheets

(51) Int. Cl.
*A01G 27/00* (2006.01)
*A01G 9/20* (2006.01)
(52) U.S. Cl.
CPC ......... *A01G 27/008* (2013.01); *A01G 31/06* (2013.01); *A01G 27/003* (2013.01)

(56) References Cited

U.S. PATENT DOCUMENTS

| | | |
|---|---|---|
| 1,796,994 A | 3/1931 | Husted |
| 3,261,259 A | 7/1966 | Baptie et al. |
| 3,314,192 A | 4/1967 | Park |
| 3,513,606 A | 5/1970 | Jones |
| 3,866,334 A | 2/1975 | Huang |
| 3,913,758 A | 10/1975 | Faircloth et al. |
| 3,931,695 A | 1/1976 | Widmayer |
| 3,944,309 A | 3/1976 | Taniwaki |
| 3,952,322 A | 4/1976 | Wolfe |
| 3,973,353 A | 8/1976 | Dedolph |
| 4,045,911 A | 9/1977 | Ware |
| 4,091,566 A | 5/1978 | Horvath et al. |
| 4,146,993 A | 4/1979 | Freeman, Sr. |
| 4,163,342 A | 8/1979 | Fogg et al. |
| 4,163,537 A | 8/1979 | Mourgue |
| 4,216,617 A | 8/1980 | Schmidt |
| 4,250,666 A | 2/1981 | Rakestraw |
| 4,255,897 A | 3/1981 | Ruthner |
| 4,258,501 A | 3/1981 | Brown |
| 4,292,762 A | 10/1981 | Fogg et al. |
| 4,349,864 A | 9/1982 | Smith |
| 4,410,157 A | 10/1983 | Monti et al. |
| 4,441,145 A | 4/1984 | Antkowiak |
| 4,567,732 A | 2/1986 | Landstrom et al. |
| 4,747,025 A | 5/1988 | Barton |
| 4,748,548 A | 5/1988 | Barton |
| 4,817,332 A | 4/1989 | Ikeda et al. |
| 4,965,962 A | 10/1990 | Akagi |
| 4,984,737 A | 1/1991 | Muth et al. |
| 5,040,329 A | 8/1991 | Michaloski |
| 5,095,653 A | 3/1992 | Guldberg |
| 5,140,507 A | 8/1992 | Harwood |
| 5,251,399 A | 10/1993 | Rasmussen |
| 5,454,187 A | 10/1995 | Wasserman |
| 5,481,439 A | 1/1996 | Goto |
| 5,515,648 A | 5/1996 | Sparkes |
| 5,675,417 A | 10/1997 | Ventura et al. |
| 5,675,931 A | 10/1997 | Wasserman |
| 5,813,168 A | 9/1998 | Clendening |
| 6,021,602 A | 2/2000 | Orsi |
| 6,112,917 A | 9/2000 | Baker et al. |
| 6,312,139 B1 | 11/2001 | Baker et al. |
| 6,532,699 B1 | 3/2003 | Franklin et al. |
| 6,578,319 B1 | 6/2003 | Cole et al. |
| 6,688,759 B1 | 2/2004 | Hadjimichael |
| 6,854,862 B1 | 2/2005 | Hopf |
| 7,124,902 B1 | 10/2006 | Chen |
| 7,176,024 B2 | 2/2007 | Branson et al. |
| 7,177,537 B1 | 2/2007 | Adolphi et al. |
| 7,370,587 B2 | 5/2008 | Janson et al. |
| 7,508,145 B2 | 3/2009 | Bourke et al. |
| 7,794,105 B2 | 9/2010 | Imberti et al. |
| 7,967,466 B2 | 6/2011 | Chu |
| 8,141,294 B2 | 3/2012 | Bribach et al. |
| 8,172,343 B2 | 5/2012 | Muth |
| 8,234,814 B2 | 8/2012 | Kertz |
| 8,358,097 B2 | 1/2013 | Cartwright |
| 8,443,990 B2 | 5/2013 | Tourdot et al. |
| 8,469,228 B2 | 6/2013 | Adams |
| 8,567,122 B2 | 10/2013 | Nelson et al. |
| 8,768,155 B2 | 7/2014 | Delzell |
| 9,239,136 B1 | 1/2016 | Petersen et al. |
| 9,322,536 B1 | 4/2016 | Parduhn et al. |
| 9,618,172 B1 | 4/2017 | Means, III |
| 10,098,287 B2 | 10/2018 | Heidl et al. |
| 2002/0040548 A1 | 4/2002 | Ware |
| 2003/0089037 A1 | 5/2003 | Ware |
| 2003/0097786 A1 | 5/2003 | Van Horssen et al. |
| 2004/0004051 A1 | 1/2004 | Miyazaki et al. |
| 2004/0085762 A1 | 5/2004 | Iwasa et al. |
| 2004/0244283 A1 | 12/2004 | Chen |
| 2006/0032115 A1 | 2/2006 | Van Den Dool |
| 2006/0072318 A1 | 4/2006 | Witham et al. |
| 2006/0156624 A1 | 7/2006 | Roy et al. |
| 2006/0218862 A1 | 10/2006 | Dyas |
| 2006/0230674 A1 | 10/2006 | Marchildon |
| 2007/0289207 A1 | 12/2007 | May et al. |
| 2008/0216403 A1 | 9/2008 | Schmidt et al. |
| 2008/0271373 A1 | 11/2008 | Fukuyama et al. |
| 2009/0031621 A1 | 2/2009 | Kitagawa |
| 2009/0235583 A1 | 9/2009 | Colless et al. |
| 2009/0272029 A1 | 11/2009 | Aiking et al. |
| 2009/0300983 A1 | 12/2009 | Tilford et al. |
| 2009/0307973 A1 | 12/2009 | Adams et al. |
| 2010/0095584 A1 | 4/2010 | Huet et al. |
| 2010/0132751 A1 | 6/2010 | Li |
| 2010/0146854 A1 | 6/2010 | Cannon et al. |
| 2010/0200528 A1 | 8/2010 | Tourdot et al. |
| 2011/0209400 A1 | 9/2011 | Rooymans |
| 2011/0215937 A1 | 9/2011 | Carroll et al. |
| 2011/0252705 A1 | 10/2011 | Van Gemert et al. |
| 2012/0000128 A1 | 1/2012 | Rochefort |
| 2012/0011768 A1 | 1/2012 | Martinez |
| 2012/0017506 A1 | 1/2012 | Zhao et al. |
| 2012/0060416 A1 | 3/2012 | Brusatore |
| 2012/0066972 A1 | 3/2012 | Lin |
| 2012/0124874 A1 | 5/2012 | Breihof |
| 2012/0167460 A1 | 7/2012 | Omidi |
| 2012/0247010 A1 | 10/2012 | Huber |
| 2012/0297678 A1 | 11/2012 | Luebbers et al. |
| 2013/0031834 A1 | 2/2013 | Mosca |
| 2013/0104452 A1 | 5/2013 | Hassle |
| 2013/0104453 A1 | 5/2013 | Hassle |
| 2013/0139437 A1 | 6/2013 | Maxik et al. |
| 2013/0180168 A1 | 7/2013 | Elliott |
| 2013/0255149 A1 | 10/2013 | Jung |
| 2013/0333287 A1 | 12/2013 | Kassouni |
| 2014/0000162 A1 | 1/2014 | Blank |
| 2014/0096446 A1 | 4/2014 | Daniels et al. |
| 2014/0115958 A1 | 5/2014 | Helene et al. |
| 2014/0144079 A1 | 5/2014 | Lin |
| 2014/0165468 A1 | 6/2014 | Roeser et al. |
| 2014/0311025 A1 | 10/2014 | Pauls et al. |
| 2015/0092397 A1 | 4/2015 | Liu |
| 2015/0308671 A1 | 10/2015 | Tischler et al. |

FOREIGN PATENT DOCUMENTS

| | | |
|---|---|---|
| EP | 2491784 | 8/2012 |
| GB | 163537 | 5/1921 |
| WO | WO 2014/037860 | 3/2014 |

OTHER PUBLICATIONS

Notice of Allowance Issued for Australian Patent Application No. 2015269088, dated Nov. 20, 2017, 3 pages.
Official Action for Canadian Patent Application No. 2951258, dated Apr. 23, 2018, 4 pages.
Official Action for Canadian Patent Application No. 2951258, dated Jan. 29, 2019, 3 pages.
International Search Report and Written Opinion for International Patent Application No. PCT/US15/34640, dated Nov. 24, 2015, 11 pages.
International Preliminary Report on Patentability for International (PCT) Patent Application No. PCT/US15/34640, dated Dec. 15, 2016, 8 pages.
Official Action for U.S. Appl. No. 14/733,173, dated Oct. 30, 2015, 6 pages, Restriction Requirement.
Official Action for U.S. Appl. No. 14/733,173, dated May 16, 2016, 11 pages.
Official Action for U.S. Appl. No. 14/733,173, dated May 4, 2017, 21 pages.
Official Action for U.S. Appl. No. 14/733,173, dated Nov. 30, 2017, 20 pages.

(56) References Cited

OTHER PUBLICATIONS

Notice of Allowance for U.S. Appl. No. 14/733,173, dated Jun. 13, 2018, 13 pages.
Corrected Notice of Allowance for U.S. Appl. No. 14/733,173, dated Jun. 22, 2018, 3 pages.

SYSTEM AND METHOD FOR CULTIVATING PLANTS

This application is a continuation of U.S. Non-Provisional patent application Ser. No. 14/733,173, filed Jun. 8, 2015, which claims the benefit of priority from U.S. Provisional Patent Application No. 62/008,700, filed Jun. 6, 2014, the entire disclosures of which are hereby incorporated by reference in their entirety.

FIELD

The present disclosure relates generally to systems and methods for growing and cultivating plants. More specifically, the present disclosure relates to systems and methods for cultivating a plurality of plants wherein at least some of the plants are distributed in a vertical orientation and at least one of space and energy efficiency is increased.

BACKGROUND

Conventional indoor plant cultivation operations are known to use indoor or artificial lighting systems to provide ultraviolet (UV) and/or infrared (IR) radiation to plants as a means for simulating sunlight, heat and desired growing conditions. In known embodiments, plants at various stages of their lifecycle are provided in a substantially horizontal arrangement, such as provided in pots distributed on a floor or elevated horizontal surface. In such arrangements, lighting elements are generally provided above the plants and direct or radiate light downwardly to the plants. Such systems are limited in that the number of plants that can be cultivated are limited by the area of the space and overcrowding concerns, as well as the fact that downwardly-directed light may not provide the ideal or desired exposure to the plants.

With respect to illumination, a typical plant grow light produces light wavelengths from 380 nm (UV) up to and beyond 880 nm (IR), however, plants only use certain groups of light wavelengths from the visible light spectrum (400 nm-700 nm). The wavelengths associated with green and yellow colors appear brighter to the human eye than red and blue colors, which are the primary colors used by plants for photosynthesis. Incandescent and fluorescent lighting are designed to light rooms but not necessarily design to be used as plant grow lights. In the past, manufacturers modified incandescent and fluorescent light bulbs and added impurities to get more of the colors that plants need to grow. As much as 82% of the light coming out of a typical plant light is not absorbed by plants or is in the form of UV light or heat.

LED grow lights offer an alternative to incandescent and fluorescent lights. For example, LED grow lights use LEDs that generate more of the particular colors of light needed to target wavelengths for plant growth. Thus, growers are able to use several colors of LEDs and select particular colors depending on the crop growing. Thus, LED grow lights are more efficient than incandescent and fluorescent lights by eliminating colors of light that are not required for plant growth.

The light from existing LED light bars is emitted in a cone shape from above the plants. Mounting the bars too close to plants will prevent the light from individual LED clusters, or sets of RGB (red, green, blue) LED lights, from blending properly before reaching the plant canopy. While coverage area increases as the LED grow lighting is moved further from the plant canopy, the light intensity decreases. When using multiple light bar arrays, increasing the distance from the plant canopy allows clusters from multiple light bars to overlap.

However, placing a light bar above of the plant canopy does not allow sufficient light to reach the lower portions of plants, nor is the light bar effective in a vertical growing system. Accordingly, there is a need for a system that provides sufficient light to plants from the canopy to the lower portions of the plant, and also provides sufficient light to plants growing in a vertical system.

SUMMARY

Accordingly, there has been a long-felt but unmet need to provide a vertical plant cultivation system that provides for vertical distribution of a plurality of individual plants in accordance with embodiments of the present disclosure. The present disclosure provides such systems and methods for growing plants in a manner that maximizes the use of space (i.e. square footage) and energy consumption. Devices, systems and methods of the present disclosure are well suited for a variety of plants and particularly plants that are desirable to grow indoors and/or in the presence of artificial lighting elements. It will be expressly recognized, however, that devices, systems and methods of the present disclosure are not limited to use with a particular type of plant, flower, crop, etc. Furthermore, it will be expressly recognized that although systems and methods of the present disclosure are well suited for increasing efficiencies of indoor growing operations, the present disclosure is not limited to such operations. Indeed, embodiments of the disclosure may be employed in a variety of settings including indoor settings, outdoor settings, and greenhouses or similar environments that may comprise characteristic of both indoor and outdoor growing.

In various embodiments, a vertically oriented array for receiving plants and plant containers is provided. The array is vertically oriented in that it comprises horizontally extending rows and vertically extending columns, such that a plurality of plants may be provided in a single vertical column and wherein adjacent plants in the column are disposed vertically above or below one another with respect to a vertical direction (i.e. substantially parallel to the direction of the force of gravity). In various embodiments, plants or storage features are staged in a vertical and/or horizontal direction. Plant units need not be evenly distributed in either a vertical or a horizontal direction, but are contemplated as being generally provided and distributed in a substantially vertical manner so as to reduce floor spaced needed for cultivation. Although various regular patterns or grids are shown and described, the present disclosure is not limited to such arrangements and various horizontal and/or vertical distributions are contemplated.

In certain embodiments, one or more arrays comprising between approximately five and twenty rows and between approximately five and twenty columns is provided. In a preferred embodiment, at least one array of six horizontally extending rows and eight vertically extending columns are provided. The intersection of each row and column comprises means for housing or cultivating at least one plant, such as one or more pots, basins, buckets, or bags to contain both soil and plant matter. U.S. Pat. No. 8,141,294 to Bribach et al., which is hereby incorporated by reference in its entirety, provides a planter system for supporting plants on a vertical surface and includes a fabric material with pleats. Such systems are contemplated by various embodiments of the present disclosure, in addition to or in lieu of racks, shelves, and pots as shown and described herein. U.S. Pat. No. 8,567,122 to Nelson et al., which is hereby incorporated by reference in its entirety, provides a plant container comprising breathable and flexible material. Features of Nelson, including providing plants in a porous structure permeable to air and water are contemplated for use with embodiments of the present disclosure.

In certain embodiments, a vertically oriented array for receiving plants is selectively translatable in a horizontal direction such that the array is moveable with respect to at least one lighting element. In certain embodiments, a rack member is provided with an array for receiving plants on two sides of the rack member. For example, in a preferred embodiment, at least one rack is provided with opposing sides and wherein each of the opposing sides comprise devices and structure for receiving and cultivating plants (e.g. potted plants) as shown and described herein.

Various embodiments of the present disclosure contemplate selectively slidable or adjustable features. U.S. Pat. No. 3,944,309 to Taniwaki entitled "Manually Movable Wheeled Storage Rack or the Like", which is hereby incorporated by reference in its entirety discloses a wheeled storage rack that may be moved along rails when an operator rotates a handwheel associated with the rack. Such features are contemplated in various embodiments of the present disclosure for providing ease of movement of one or more racks. For example, various features of Taniwaki including the push knobs for locking a position of a rack, an endless power transmission device connecting at least one driving wheel and at least one driven wheel, and various other related features are contemplated for use with the present disclosure. Various alternatives, however, are also contemplated and no limitation with respect to the devices of Taniwaki is provided herewith.

U.S. Pat. No. 7,508,145 to Bourke et al. discloses a mobile storage system with units that can be selectively positioned, and a control arrangement to control the position of units based on user commands. Bourke et al. is incorporated by reference in its entirety for all purposes, and as if fully rewritten herein.

U.S. Patent Application Publication No. 2010/0200528 to Tourdot et al. discloses a mobile rack system with a flue spacer and a motor control. The rack of Tourdot et al. is capable of being used on unleveled surfaces. Tourdot et al. is incorporated by reference in its entirety for all purposes, and as if fully rewritten herein.

U.S. Pat. No. 4,984,737 to Muth et al. discloses a mobile shelving apparatus with rails and interlocking shims. Muth et al. discloses wheel assemblies and anchor clip members, and is incorporated by reference in its entirety for all purposes, and as if fully rewritten herein.

U.S. Pat. No. 7,370,587 to Janson et al. discloses a mobile storage system with a carriage adapted to support a storage unit and allow movement of the unit along a rail. A wheel mounting subassembly is further provided. Janson is incorporated by reference in its entirety for all purposes, and as if fully rewritten herein.

Various lighting features and lighting types are contemplated for use with the present disclosure. For example, U.S. Patent Application Publication No. 2013/0139437 to Maxik et al., which is hereby incorporated by reference in its entirety, discloses an illumination and grow light system to optimize plant growing operations which are contemplated by various embodiments of the present disclosure. Additionally, U.S. Patent Application Publication No. 2011/0209400 to Rooymans, which is hereby incorporated by reference in its entirety, discloses a lighting assembly for growing plants. Rooymans provides multiple light sources, including LED light sources, for providing light in different wavelengths or wavelength ranges. Such features and methods are contemplated for use with various embodiments of the present disclosure.

U.S. Patent Application Publication No. 2013/0104453 to Hassle, which is hereby incorporated by reference in its entirety, discloses a method and system for growing plants. The features of U.S. Patent Application Publication No. 2013/0104453 to Hassle are contemplated for use with the present disclosure, including movement and automatic movement of plants during a growing process, for example, are contemplated for use in certain embodiments of the present disclosure.

U.S. Patent Application Publication Number 2013/0104452 to Hassle, which is hereby incorporated by reference in its entirety, discloses a building with integrated greenhouse features. The features of U.S. Patent Application Publication Number 2013/0104452 to Hassle are contemplated for use with embodiments of the present disclosure. For example, various features related to building structures comprising a skin façade that allows for entrance of light and greenhouse effects are contemplated for use in certain embodiments of the present disclosure.

U.S. Patent Application Publication No. 2011/0252705 to Van Gemert et al., which is hereby incorporated by reference in its entirety, discloses a system and method for growing plants in a conditioned environment. The features of U.S. Patent Application Publication No. 2011/0252705 to Van Gemert are contemplated for use in the present disclosure. For example, various embodiments of the present disclosure comprise cultivation base features, temperature control elements, and heating are elements as shown and described in U.S. Patent Application Publication No. 2011/0252705 to Van Gemert.

U.S. Patent Application Publication No. 2014/0096446 to Daniels et al., which is hereby incorporated by reference in its entirety, discloses a vertical planting tray system. The features of U.S. Patent Application Publication No. 2014/0096446 to Daniels are contemplated for use with embodiments of the present disclosure. For example, tray systems that are not constrained by vertical walls and allow for expansion of root systems as shown and described in U.S. Patent Application Publication No. 2014/0096446 to Daniels are contemplated for use in various embodiments of the present disclosure.

The irrigation systems and features as shown and described in U.S. Patent Application Publication No. 2014/0096446 to Daniels are also contemplated for use in certain embodiments of the present disclosure.

In certain embodiments, irrigation and water-supply systems are provided comprising a primary tank for retaining a fluid. The fluid preferably comprises water, and the fluid may be enriched with nutrients, fertilizers, pesticides or various other additives as will be recognized by one of skill in the art and depending on the particular application and plant(s) to be cultivated. The primary tank comprises a refillable vessel that may be replenished from various water sources, including a municipal water supply. Although the present disclosure is not limited to a tank or vessel of any particular size or volume, a preferred embodiment of the present disclosure comprises a vessel of between approximately 200 and 300 gallons. Although smaller and larger vessels, including those in the range of 1 to 2,000 gallons, are contemplated, preferred systems and methods of the disclosure contemplate using a vessel or receptacle in the range of approximately 250 gallons to enhance process control, regulate additives, reduce waste, and generally create a more user-friendly system. It will be recognized that the size of the primary tank may be widely varied based on the type of plants, number of plants, and size of growing operation, for example. In alternative embodiments, a fluid receptacle or tank is not provided. For example, in certain embodiments, water is supplied to plants within a system directly via a municipal water supply and/or is provided directly to plants by manual watering from canisters, cans, portable tanks, etc.

In various embodiments, fluid is supplied or dispensed from the primary tank to at least one plant provided in the system by a pump. Specifically, a pump is provided to draw fluid from the primary tank and distribute the fluid to a desired plant, or plurality of plants. In certain embodiments, the pump and related fluid flow is controlled and regulated by a control unit, such as the commercially available GAL-CON® irrigation and propagation systems. Such systems comprise the ability to selectively regulate the volume, timing, and location of water or fluid to be dispensed to one or more plants provided in the system. One or more solenoids are preferably provided to selectively regulate flow to a plurality of zones or sections, including plants in zones or sections are different horizontal and vertical locations. In certain embodiments, the irrigation system comprises an air pump and a recirculation to oxygenate water and prevent stagnation and/or growth of undesirable cultures.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of these inventions.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Figure 1:
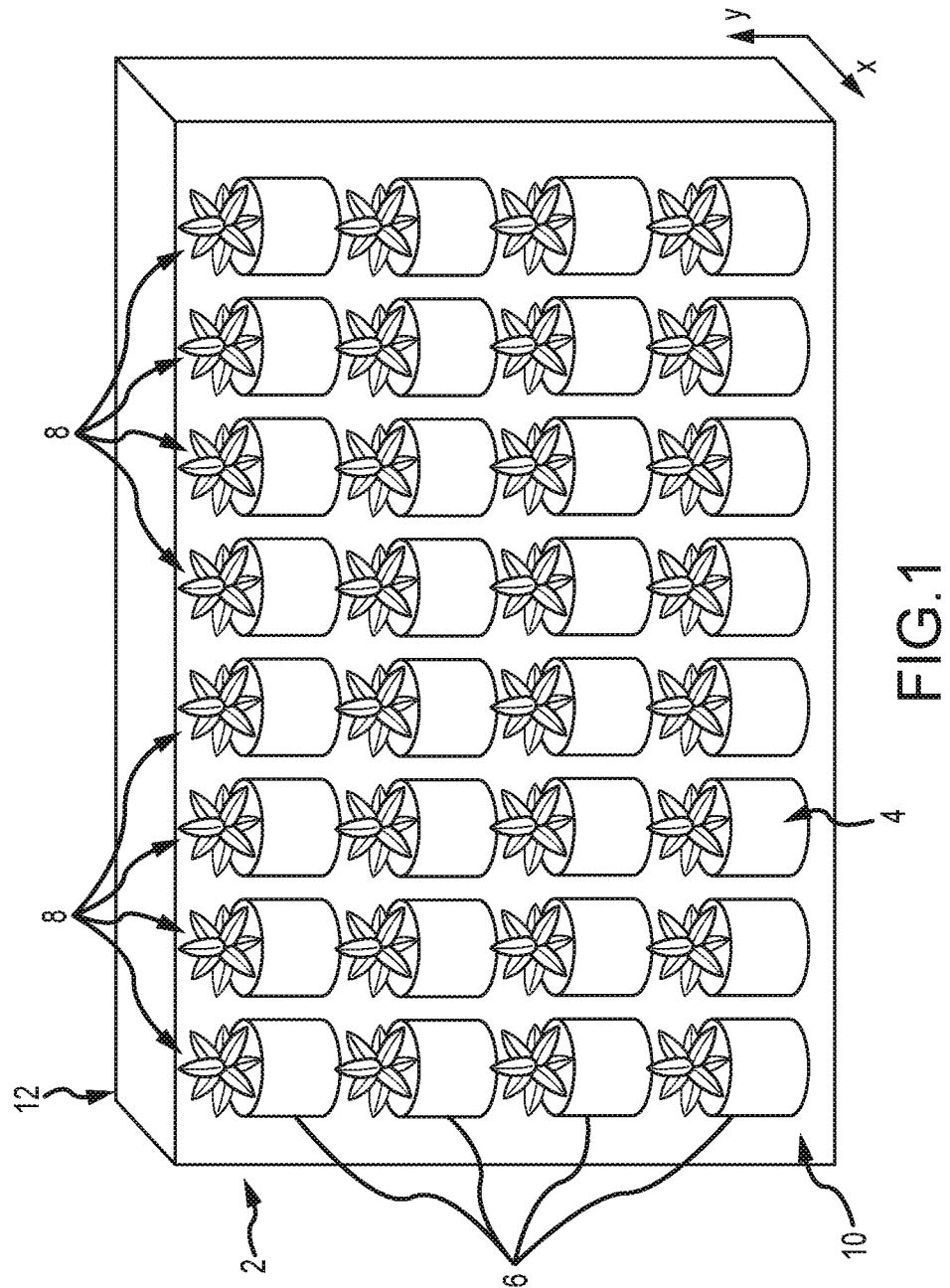
FIG. 1 is a front view of features of a cultivation system according to one embodiment of the present disclosure.

FIG. 1 is a front view of components of a cultivation system comprising a rack 2 for receiving a plurality of storage units 4 or receptacles for housing and cultivating one or more plants. As shown, the rack extends in at least a vertical (y) direction and comprises an array of storage units 4 that are distributed in substantially horizontal rows 6 and substantially vertical columns 8. In FIG. 1, a first side 10 of a rack 2 is shown as comprising a plurality of storage units 4, the storage units each preferably comprising one or more plants. In certain embodiments, storage units 4 comprise a receiving member for receiving a bucket or pot for plants. Receiving members may include adjustable, tiltable, pivoting, removable, slidable, and/or rotatable features for receiving a plant and/or a pot. In alternative embodiments, a simple shelf may be provided, and storage units 4 comprise a pot or receptacle for plants. It will therefore be recognized that storage units 4 are contemplated as comprising any number of features that may house one or more plants. An aspect of certain embodiments of the present disclosure contemplates further providing a plurality of storage units 4 on a second side 12 or face of the rack 2. In various embodiments, racks 2 of the present disclosure are translatable in the x-axis, and may be provided with tracks and rollers to facilitate movement. Although FIG. 1 provides an array comprising four rows 6 and eight columns 8, it will be expressly recognized that the present disclosure is not limited to such an arrangement. Indeed, any number of rows and/or columns is contemplated as being within the scope and spirit of the present disclosure. For example, in one embodiment, a rack 2 extends in the vertical direction (y) approximately 14 feet and comprises 3 or more rows 6.

Figure 2:
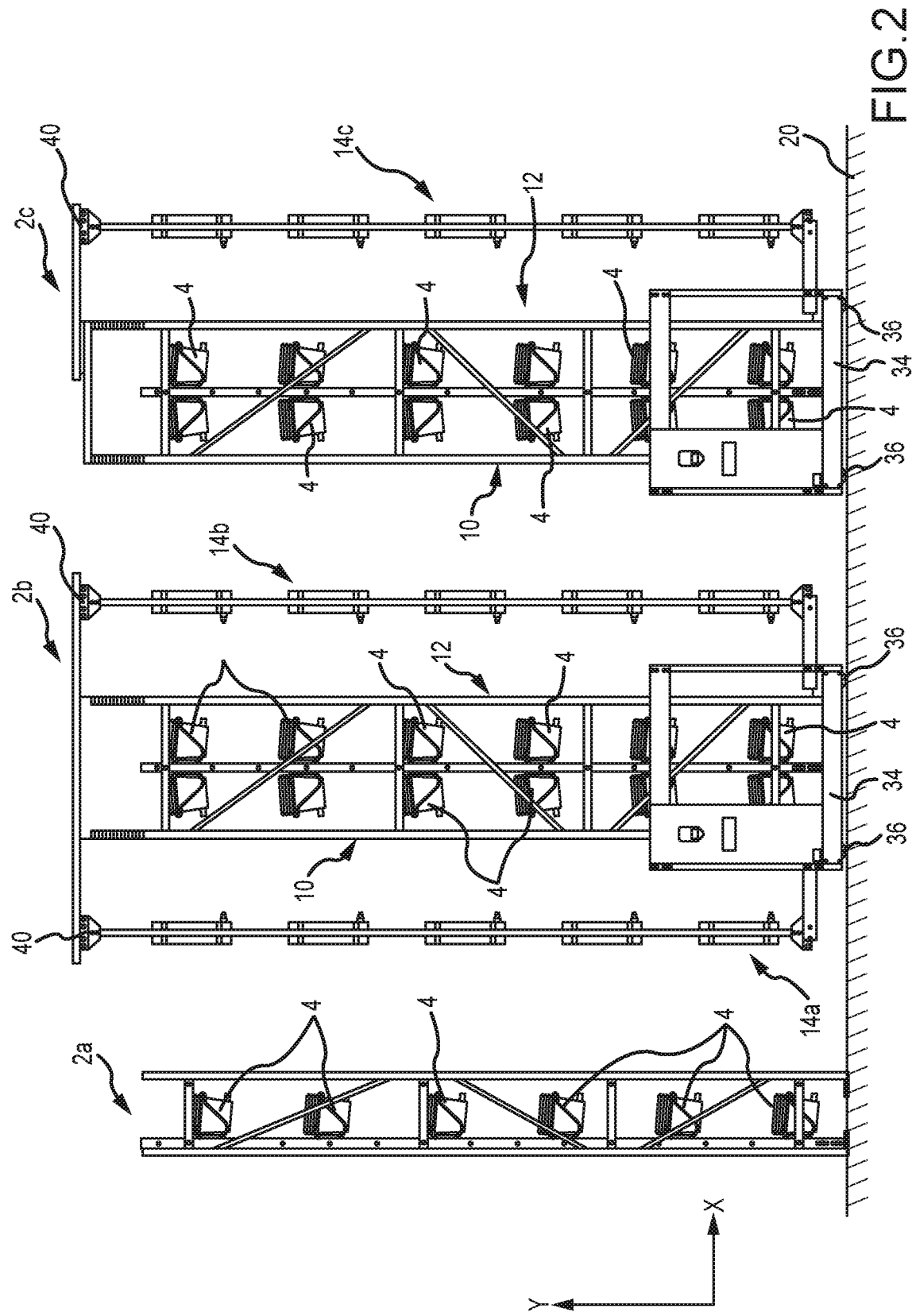
FIG. 2 is an elevation view of a cultivation system according to one embodiment of the present disclosure.

FIG. 2 is a side elevation view of a system according to one embodiment of the present disclosure. As shown, a plurality of racks 2a, 2b, 2c are provided wherein the racks 2 extending in at least a vertical direction. A first rack 2a is provided in a substantially fixed horizontal position. It will be expressly recognized, however, that first rack 2a need not be fixed. The first rack 2a may be secured or anchored to a floor or wall surface and generally immobile within a room or space. The rack 2a is provided with storage units 4 on one side of the rack, the storage units 4 being distributed in at least a vertical direction. The embodiment of FIG. 2 provides six rows of storage units 4 distributed along a height of the rack 2a, the storage units 4 having approximately equal distribution. The spacing and distribution of the storage units 4 may be altered. For example, it is contemplated that the plants and/or plant-receiving structures may be selectively secured to the rack 2a by fasteners or other known materials to facilitate ease of movement of the storage units 4. In this manner, plants may be arranged or re-arranged depending on user-desired spacing which may be related to plant type, size, and various desired growing conditions. Although certain embodiments contemplate providing plants in approximately even or equal distribution, it will be recognized that the present disclosure is not so limited. Indeed, various distributions of plants and plant receiving features are contemplated by the present disclosure.

As shown in FIG. 2, a second rack 2b is provided. The second rack 2b is provided in substantially parallel planar arrangement to the first rack 2a such that a first side 10 of the rack 2b faces and is substantially parallel to a first side 10 of the first rack 2a, and a second side 12 of the second rack 2b is provided as an opposing face of the first side 10. The second rack 2b is provided on a roller assembly 34 comprising roller wheels 36 adapted to roll or slide within elongate tracks such as may be provided on a floor surface. The rack 2b is supported on the roller assembly 34 such that the rack 2b is translatable in at least one axis (i.e. laterally as shown in FIG. 2). Additionally, an overhead track (not shown) may be provided. The overhead track 38 may be secured to a ceiling or provided as an independent stand-alone structure. The second rack 2b further comprises lighting elements 14 provided on each side of the rack 2b. The lighting elements 14 are provided in a fixed position relative to the plants of the second rack 2b, and moveable relative to at least the first 2a and third 2c racks. In alternative embodiments, it is contemplated that the lighting elements 14 interconnected to the second rack 2b are moveable with respect to the second rack 2b. For example, the lighting elements may be provided on slideable tracks or hinged members such that they are moveable with respect to the rack 2b and/or storage units 4 provided on the rack 2b. Preferably, however, the lighting elements 14 of the second rack 2b are provided on elongate tracks or supports 40 that are spaced apart and substantially fixed with respect to the second rack 2b.

As shown in FIG. 2, a third rack 2c is provided. The third rack 2c comprises a similar structure to the second rack 2b, including the roller assembly 34.

The third rack 2c, however, comprises a lighting feature 14c provided on a second side 12 of the third rack 2c. The first side 10 of the third rack 2c is devoid of a fixed lighting element, and is impacted by light from the second light 14b of the second rack 2b. Accordingly, the first side 10 of the third rack 2c and associated storage units 4 may be easily spaced apart from the lighting elements 14b when less exposure to UV or heat from the lights 14 is desired. The embodiment shown in FIG. 2 provides for a plurality of racks for housing plants to be cultivated, wherein at least one of the racks of provided in a substantially fixed position in a room or area, and at least two selectively removable racks for housing plants to be cultivated that are movable relative to a room or area.

FIG. 2 depicts one embodiment of the present disclosure comprising a specific arrangement of rack 2 and light 14 features. It will be recognized, however, that various additional embodiments and arrangements are contemplated by the present disclosure. For example, one embodiment of the present disclosure comprises multiple sliding racks 2 with light elements 14 disposed on both sides of the rack, wherein the multiple sliding racks are provided between fixed racks and/or racks with a single light source. Another embodiment of the present disclosure contemplates an arrangement of racks wherein all racks 2 are slidable with respect to a floor or area. Accordingly, the present disclosure is not limited to any embodiment or arrangement but generally contemplates a system wherein plants are provided and distributed in at least a vertical direction, wherein the system comprises at least one slidable rack, and wherein the system comprises at least one lighting element that is movable relative to at least one rack.

As shown in FIG. 2, plurality of storage units 4 are provided as pots 22, and the pots 22 are received by receiving members 24. Individual storage units 4 and respective pots 22 may thus be removed from the system.

Figure 3:
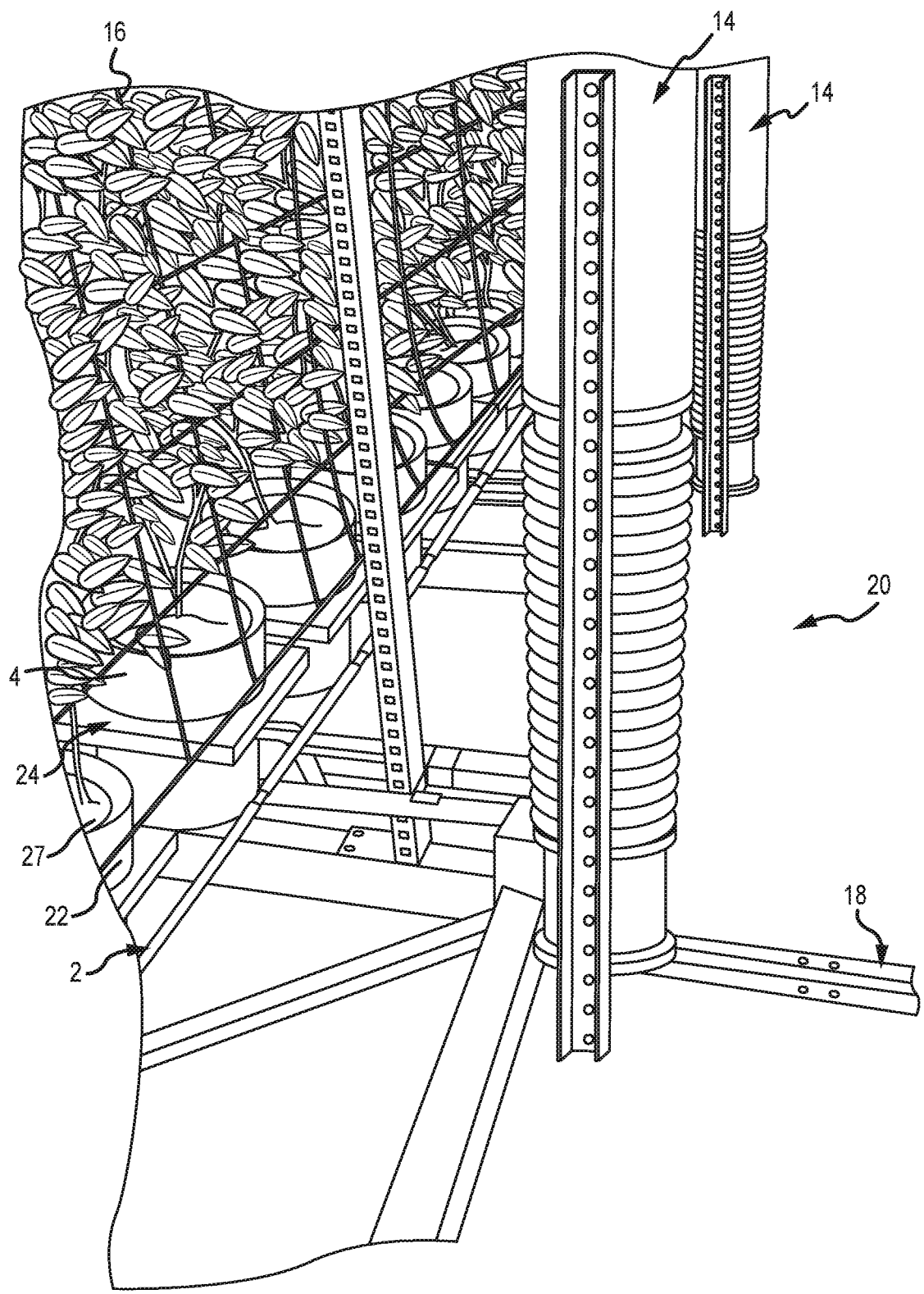
FIG. 3 is a perspective view of features of a cultivation system according to one embodiment of the present disclosure.

FIG. 3 is a perspective view of a cultivation system according to one embodiment of the present disclosure wherein a rack 2 is provided with a plurality of storage units 4 distributed in at least a horizontal and a vertical direction. The system comprises vertically elongate lighting elements 14 for providing light and/or heat to the plants. Lighting elements 14 comprise, for example, a COOL TUBE Model Number RFCOOL6, which is commercially available through HYDROFARM®.

In the embodiment provided in FIG. 3, the rack 2 including the storage units 4 provided therein and lighting elements 14 connected thereto are slidable along one or more tracks 8 provided on or in a floor surface 20. The rack 2 is selectively translatable along the track(s) 8 to adjust the position of the rack 2 in a horizontal direction. This adjustability is provided to economize space and/or adjust a relative position of one or more lighting elements 14 or the storage units 4. In the embodiment provided in FIG. 3, the lighting elements 14 are provided in a fixed position relative to the rack 2 and storage units 4. However, a further rack (not shown) may be provided on an opposing side of the lighting elements 14 as depicted in FIG. 3, the further rack comprising another array of storage units and/or plants that may adjustable relative to the storage units 4. In alternative embodiments, the lighting elements 14 are not interconnected to the rack 2 but are freely horizontally adjustable. In such embodiments, the lighting elements 14 may be provided within the track 18, provided on wheels, or provided on adjustable hanging features or other structures co-located relative to the plants, for example. Thus, in various embodiments, the present disclosure provides for lighting elements wherein a distance between a plant or plants and the lighting element is selectively adjustable. Such features provide for a user to alter the proximity of the light source to the plant and thereby adjust and simulate various growing conditions throughout the grow cycle of a plant including but not limited to the intensity of UV and IR light impacting the plants.

As further shown in FIG. 3, embodiments of the present disclosure comprise a support member 16 provided in combination with a rack. The support member 16 comprises at least one of a net, a trellis, a mesh, or various other devices adapted to at least partially support the weight of a mature plant provided with the system.

Figure 4:
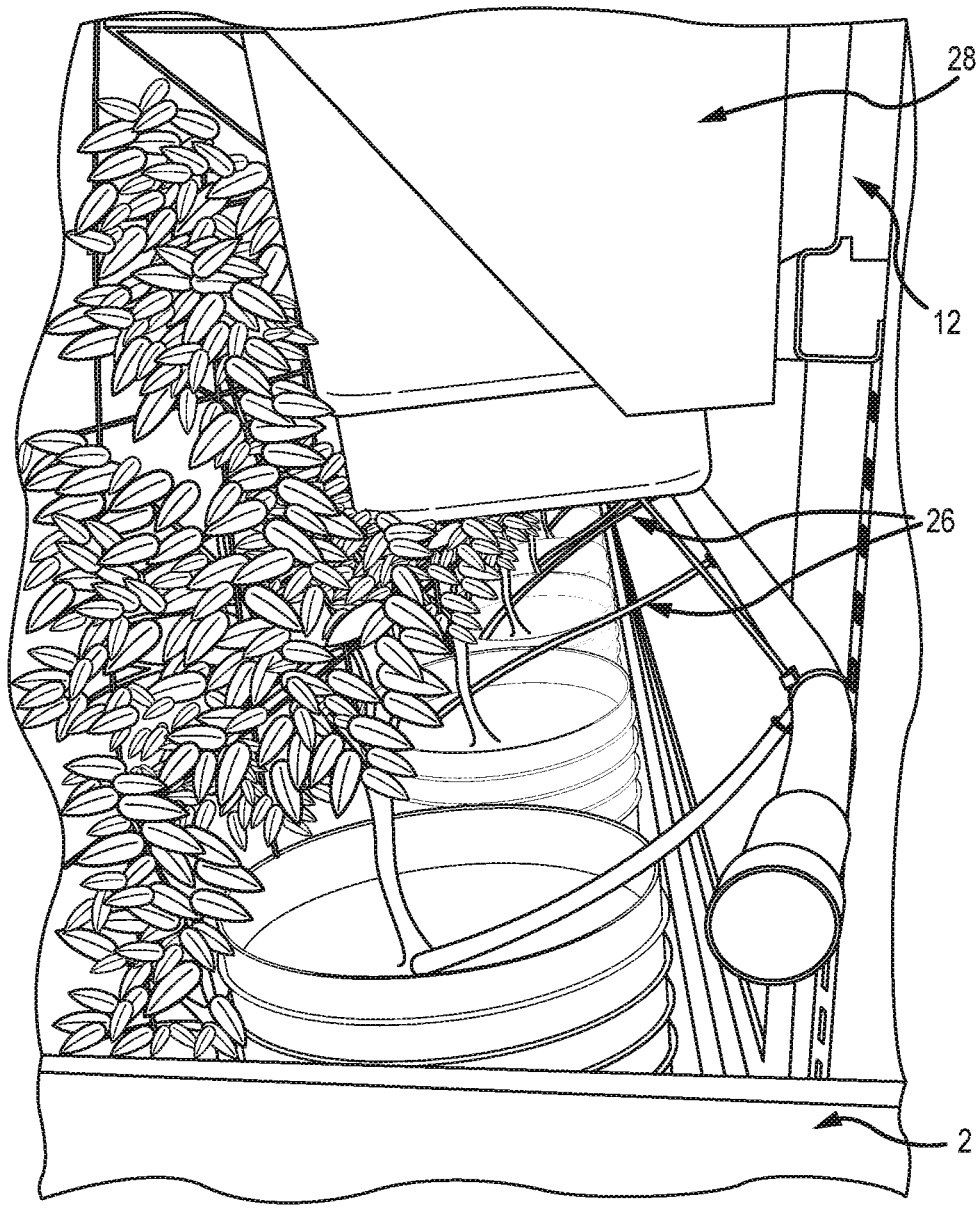
FIG. 4 is a perspective view of features of a cultivation system according to one embodiment of the present disclosure.

FIG. 4 is a side view of a rack 2 according to certain embodiments of the present disclosure wherein a plurality of pots 22 are provided in receiving members 24. The rack 2 comprises flexible irrigation conduits 26 for providing water and/or nutrients to the storage units 4. The irrigation conduits 26 are preferably flexible so that they account for movement of the rack 2 and are operable regardless of the horizontal positioning of the rack 2. Similarly, drain lines 27 are provided to remove excess water from the soil provided in the pot. Drain lines 27 may be provided on any or all of the pots in a system, and may channel water and fluid away from the plants. In certain embodiments, water drained away from the plant(s) may be reused and recycled for various purposes.

As further shown in FIG. 4, the rack 2 comprises a panel 28. In various embodiments, the panel 28 comprises a reflective panel that substantially prevents light and heat from radiating through the rack 2 to an opposing side 12 of the rack 2 where further plants may be provided. In various embodiments the panel 28 comprises at least one of a reflective and an absorptive material, such as at least one of metal and paint that substantially prevents transmission of the light to the opposing side 12 of the rack 2. It may be desirable to reflect light to promote plant growth, or absorb light to either or both inhibit growth or one position of the plant or to provide heat within the facility housing the plants.

Figure 5:
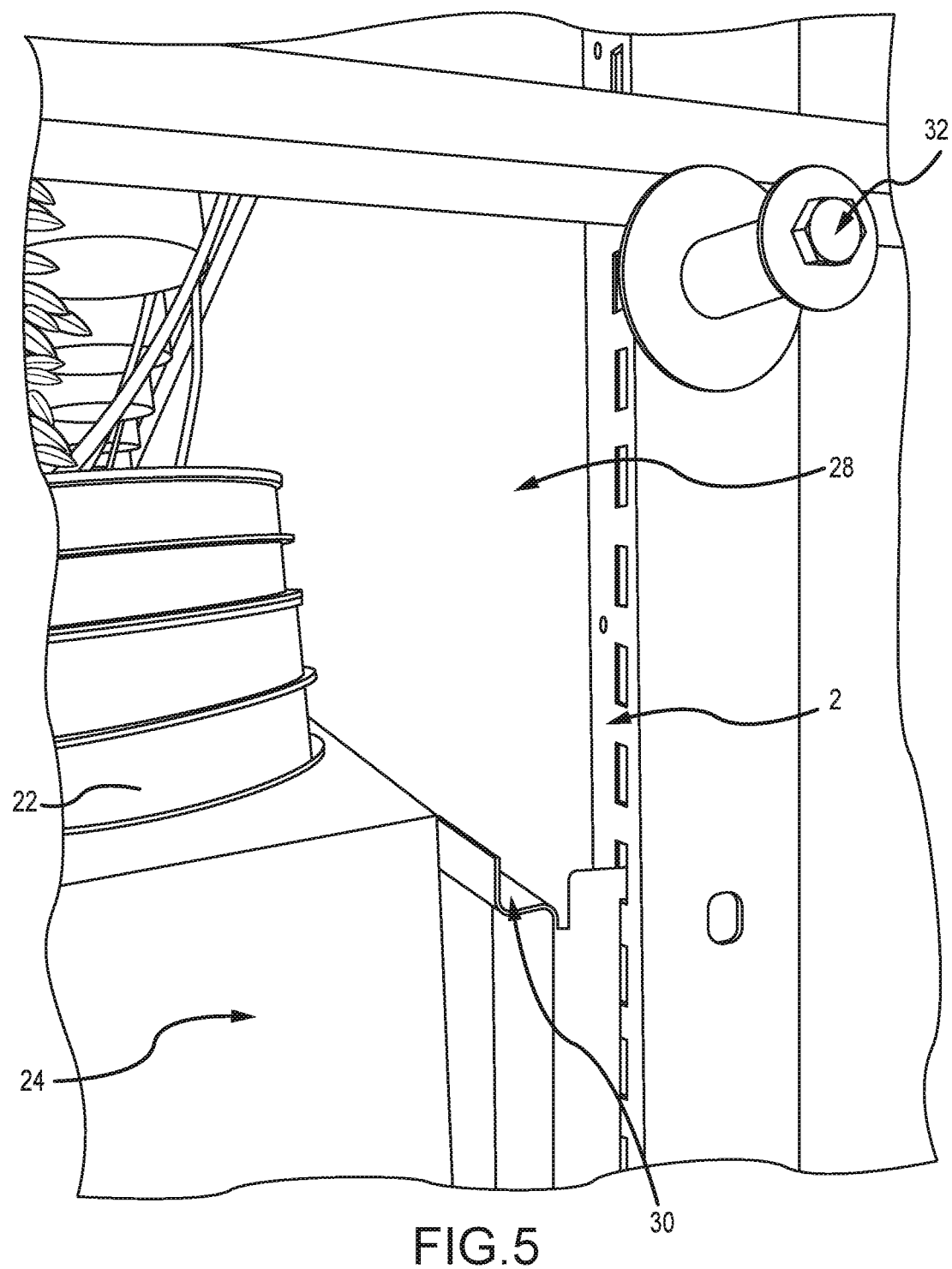
FIG. 5 is a perspective view of features of a cultivation system according to one embodiment of the present disclosure.

FIG. 5 is a detailed perspective view of a system according to one embodiment of the present disclosure. As shown, a rack 2 comprises receiving members 24 for pots 22 which contain one or more plants for cultivation. A substantially reflective panel 28 is provided to prevent transmission of light and to encourage plant growth on a first side of the plant. Rack features, such as receiving members 24, are adjustable in at least a height and width direction. A lip 30 for laterally slidable receiving members 24 is provided, and receiving members 24 may be removed and/or relocated along a length of the lip 30. The vertical positioning of the receiving members 24 may be altered by pin connections 32. Thus, spacing of pots 22 and plants may be selectively adjusted in at least two orientations such that plants of different sizes (for example) may be accommodated, or more space may be allowed as plants mature.

Figure 6:
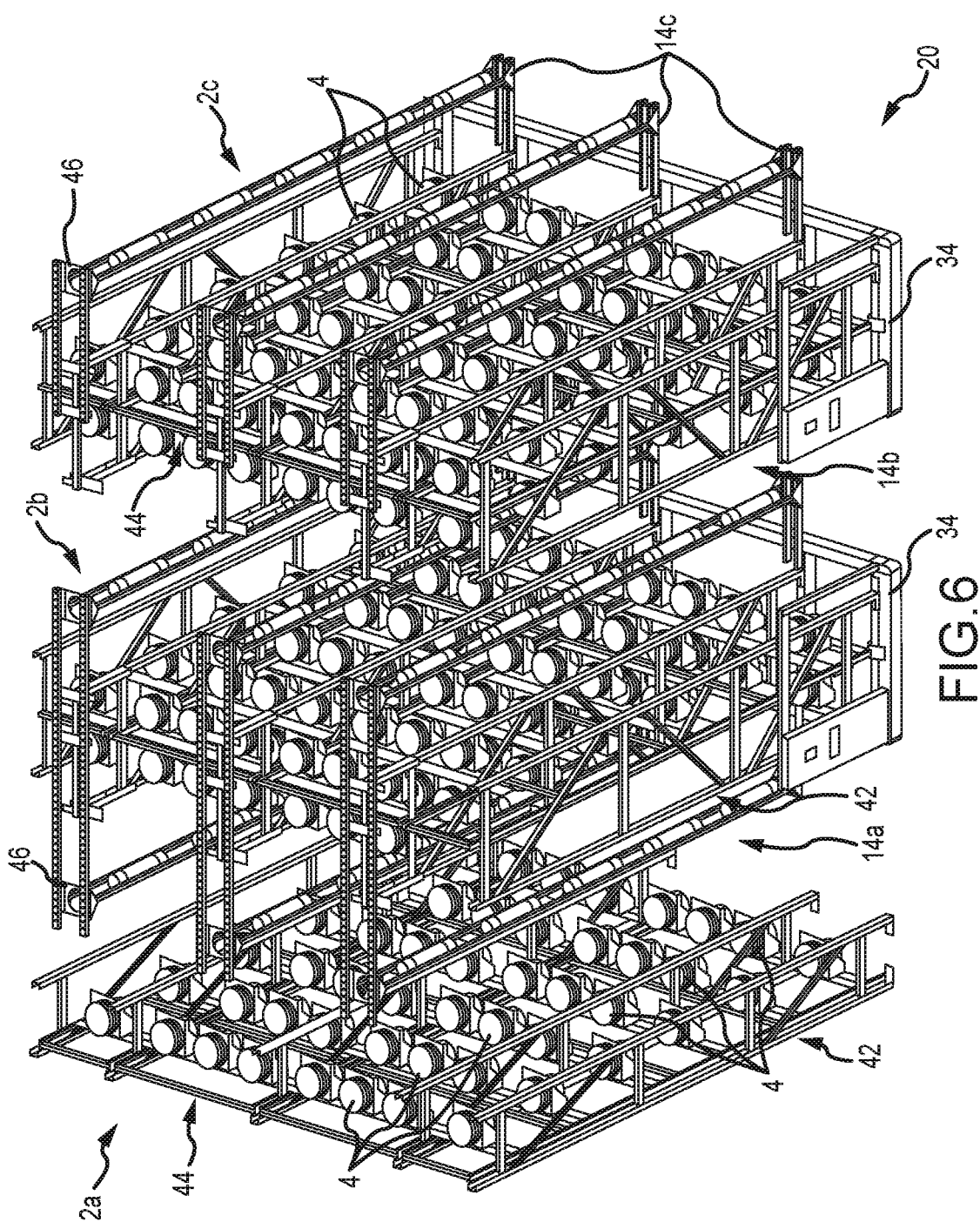
FIG. 6 is a perspective view of a cultivation system according to one embodiment of the present disclosure.

FIG. 6 is a perspective view of a system according to one embodiment of the present disclosure. FIG. 6 provides a rack system comprising three racks 2a, 2b, 2c, wherein the first rack 2a comprises a rack that is substantially fixed with respect to a flooring or ground surface 20. The first rack 2a comprises a 6×8 array of storage units 4. The first rack 2a is generally devoid of lighting elements secured directly to the first rack 2a. The first rack 2a is secured to a ground or horizontal surface 20 at a base portion of the rack 2a. Specifically, brackets and/or fastener-receiving hardware may be attached to or provided integral with a lower portion of the rack 2a for securing the rack. The rack 2a comprises a plurality of vertical support members 42 and a plurality of horizontal members 44, the vertical and horizontal support members providing structural support to the rack 2a. In the embodiment depicted in FIG. 6, the first rack 2a is devoid of a central panel, but alternative embodiments contemplate the provision of a panel member including a panel member comprising reflective properties.

The embodiment of FIG. 6 further comprises a second rack 2b, the second rack 2b comprising a first side 10 and a second side 12, each of the first side 10 and second side 12 comprising an array of storage units 4. In the depicted embodiment, each of the first side 10 and the second side 12 of rack 2b comprises an array of storage units 4. The first side 10 and second side 12 are generally separated by a reflective and/or opaque surface 28 as shown and described with respect to FIG. 5. The second rack 2b is translatable along a floor or ground surface 20 via a roller assembly 34 comprising roller wheels 36. The rack 2b preferably comprises a framework comprising a plurality of vertical support members 42 and a plurality of horizontal members 44, wherein the support members provide structural support to the storage units 4 and permit the entire rack 2b to move or translate as a single unit. The first 10 and second 12 sides of the second rack 2b shown in FIG. 6 are provided with lighting elements 14a, 14b, respectively. A first lighting element 14a is provided in a substantially fixed position relative to the first side 10 of the second rack 2b, and is movable with respect to the first rack 2a as the second rack 2b is movable with respect to the first rack 2a. The first lighting element therefore provides a light and heat source to the first rack 2a and at least a portion of the second rack 2b, wherein the lighting element 14a is moveable at least with respect to the first rack 2a. The second side 12 of the second rack 2b comprises a lighting element 14b provided in a substantially fixed position relative to the first side 12 of the rack 2b. A third rack 2c is provided, wherein a first side 10 of the third rack 2c is devoid of a lighting feature, but wherein the second lighting element 14b of the second rack 2b is provided to supply light and/or heat to the second side 12 of the second rack 2b and the first side 10 of the third rack 2c. A distance between storage units 4 provided on the first side 10 of the third rack 2c and the second lighting element 14b are adjustable by movement of the second rack 2b and/or the third rack 2c. A second side 12 of the third rack 2c comprises a lighting element 14c for providing light and/or heat to storage units 4 provided on the second side 12 of the third rack 2c.

As shown and described, lighting features 14 are moveable with respect to storage units 4 at least through movement of one or more translatable racks 2. In certain embodiments, and as shown in FIG. 6, one or more racks 2 further comprise track members 46 along which a position of the lighting features 14 are moveable. Track members 46 provide an additional adjustment feature for positioning the lights with respect to the racks 2.

In various embodiments, a method for growing and cultivating plants is provided. In one embodiment, and referring to the system of FIG. 2, a method of cultivating plants is provided, the method comprising the steps of providing a plurality of new plants on a first rack 2a, and providing at least partially matured plants on rack 2b. A lighting element 14a is provided and positioned closer to the new plants on rack 2a at a distance that is greater than a distance between the lighting element 14a and the more mature plants provided on the second rack 2b. During the course of a growing cycling, the lighting element 14a is gradually or incrementally moved away from the plants on rack 2a as those plants mature. At a point where the plants on a first side 10 of the second rack 2b are considered sufficiently mature, the plants of rack 2b are removed from that rack and new plants are provided in their place. Such new plants may comprise the plants that were previously maturing on the first rack 2a. Such operations may be varied and repeated as may be required by plant type, desired size or flower/fruit production, etc.

Figure 7:
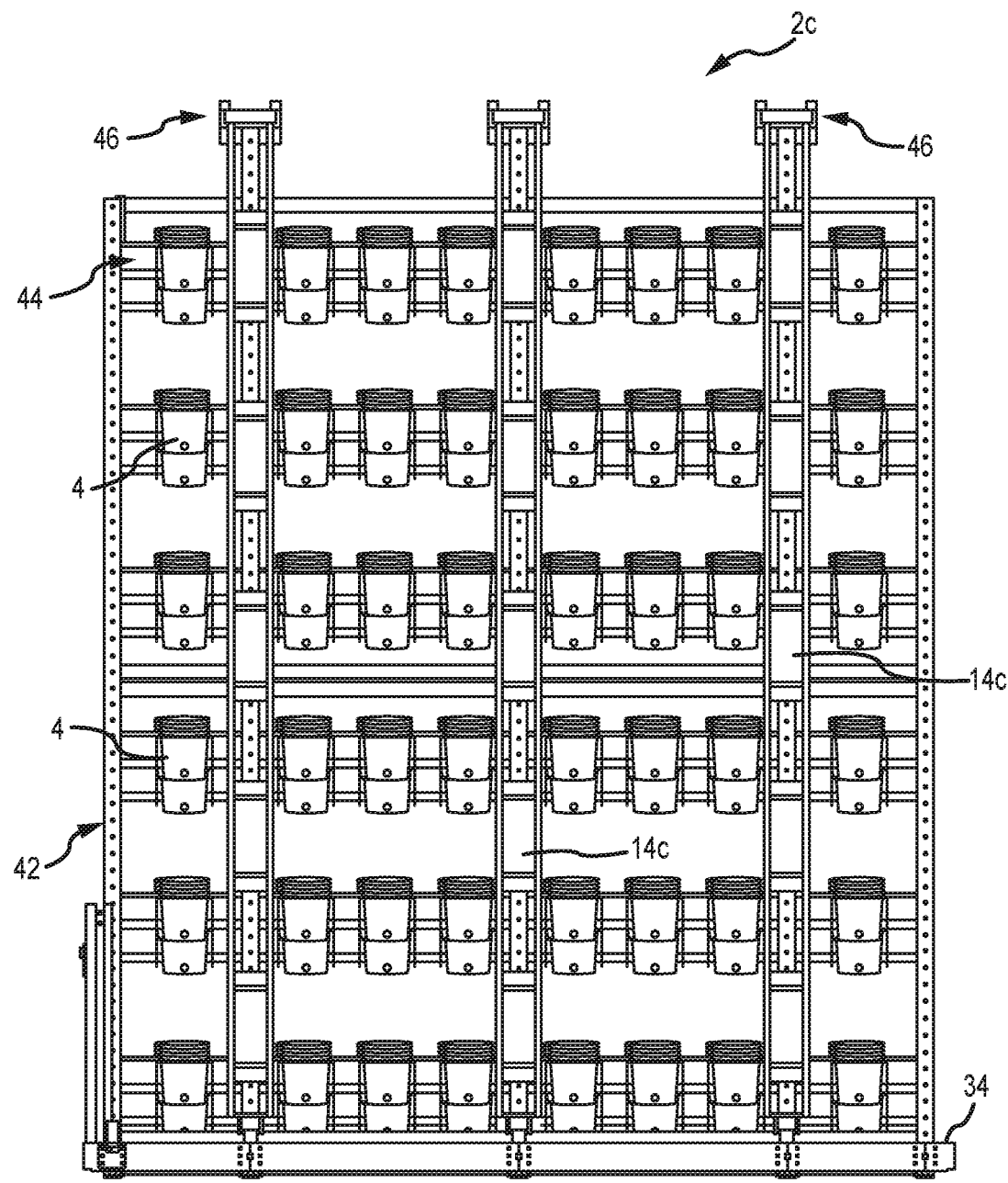
FIG. 7 is a side elevation view of a cultivation system according to one embodiment of the present disclosure.

FIG. 7 is a side elevation view of a cultivation system according to an embodiment of the present disclosure. FIG. 7 depicts a rack 2c as shown and described herein and in accordance with the embodiment of FIG. 6. As shown, the rack 2c comprises a plurality of storage units 4, the storage units 4 provided in a 6×8 array. It will be expressly recognized, however, that any number of rows or columns may be provided. Indeed, it is contemplated that plants or storage units 4 may be removed from the system as may be desirable for arranging or harvesting of plants. A plurality of lighting elements 14c are provided, the lighting elements comprising vertically elongate LED lighting features for providing light and heat to the system.

Figure 8:
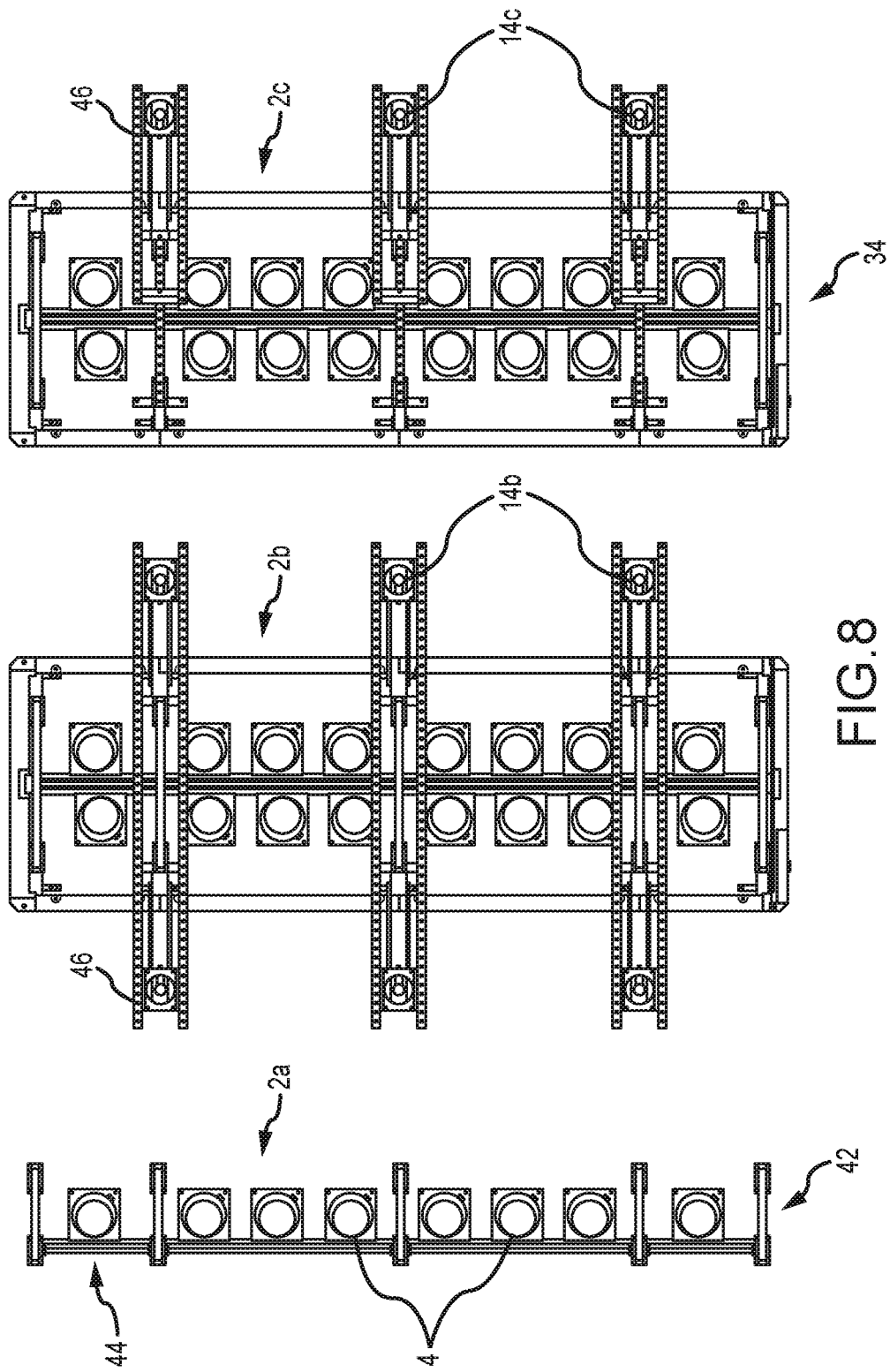
FIG. 8 is a top plan view of a cultivation system according to one embodiment of the present disclosure.

FIG. 8 is a top plan view of a system according to one embodiment of the present disclosure. FIG. 8 provides a top plan view of a system with a plurality of racks 2a, 2b, 2c and in accordance with the embodiment of FIG. 6. Various rack features as shown and described are provided.

Figure 9:
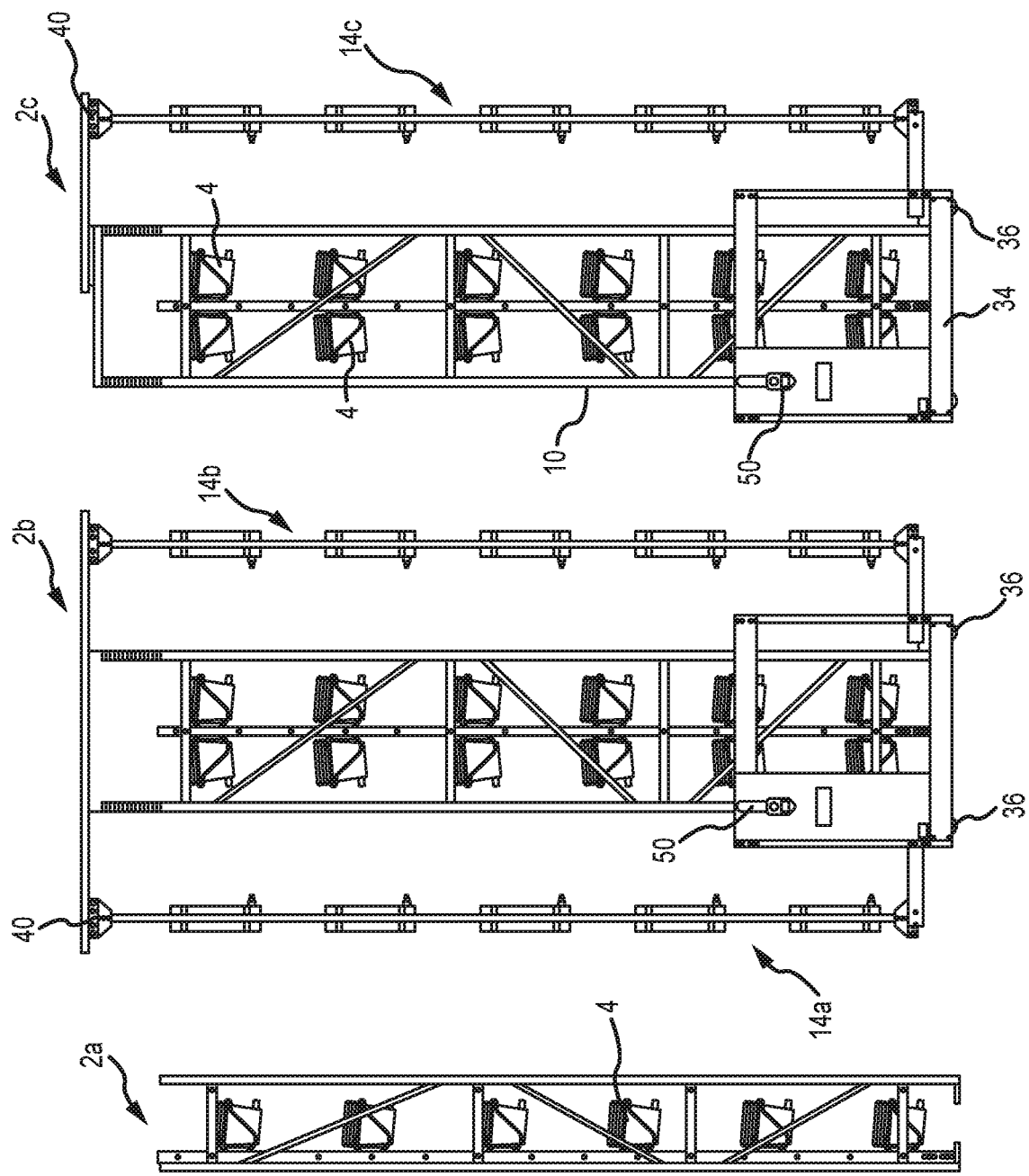
FIG. 9 is a side elevation view of a cultivation system according to one embodiment of the present disclosure.

FIG. 9 is a side elevation view of a cultivation system according to one embodiment of the present disclosure. As shown, rack members 2b, 2c comprise a handwheel 50 for selectively positioning the rack members 2b, 2c. The handwheel 50 is preferably provided in communication with wheels 36 of the rack(s), and allows for simple movement of racks in at least one axis when rotated by hand.

Figure 10:
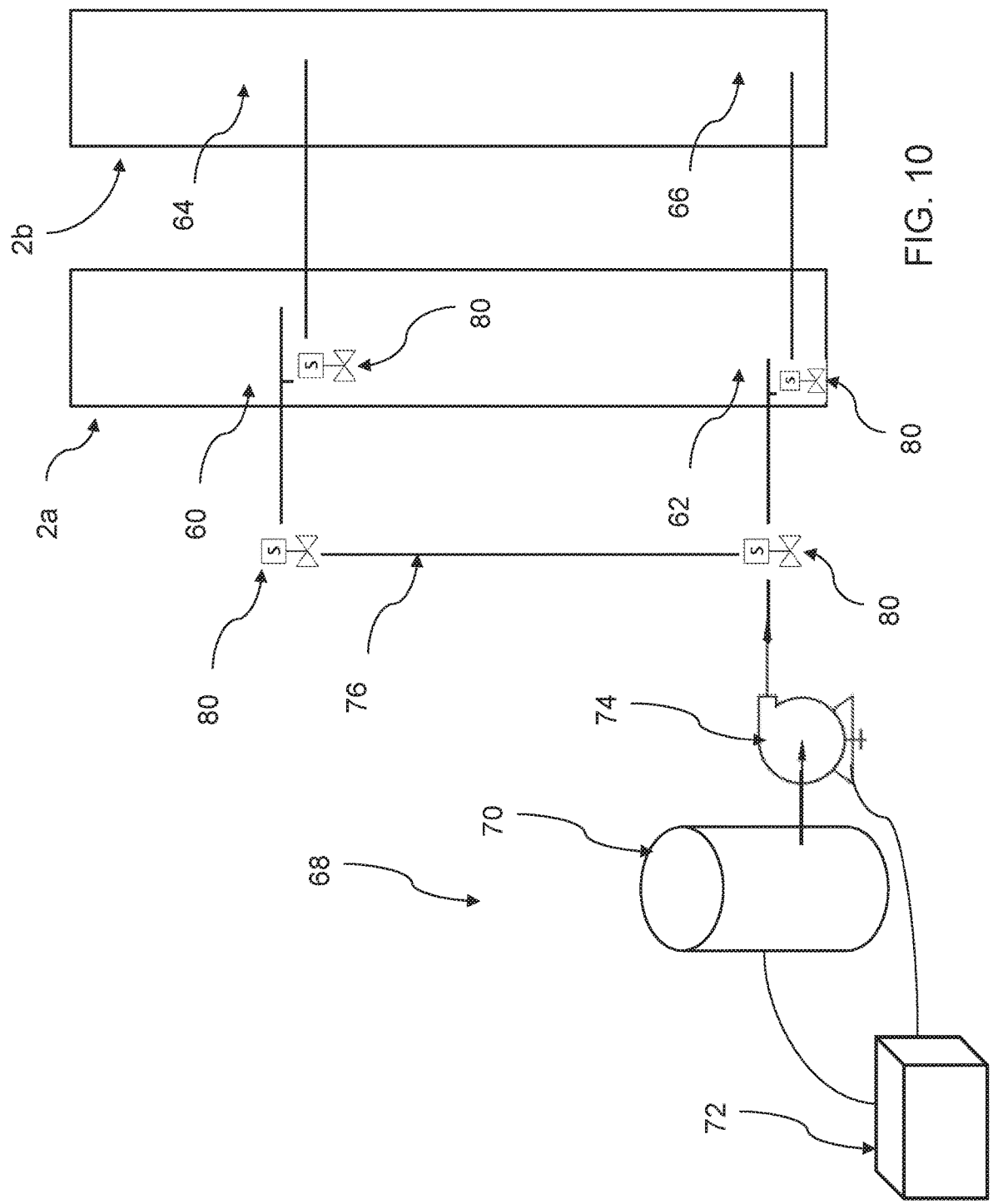
FIG. 10 is a schematic of a cultivation system according to one embodiment of the present disclosure.

FIG. 10 is a schematic of one embodiment of the present disclosure wherein an irrigation system 68 is provided in fluid communication with at least one rack for storing and cultivating plants. As shown, the irrigation system 68 comprises a fluid storage tank 70. In the depicted embodiment, the fluid storage tank 70 is interconnected to a first 2a and second 2b storage rack for plants. A pump 74 is provided to draw and/or force fluid from the tank 70 to at least one location on the first 2a and/or second 2b storage rack. In various embodiments, the tank 70 is contemplated as receiving, storing, and dispensing a fluid such as water. One of skill in the art will recognize, however, that the present disclosure is not limited to a tank with any particular contents. Indeed, it is also contemplated that a fluid within the tank 70 comprises water with additives such as fertilizer, nutrients, pesticides, and similar materials dissolved or provided in suspension. In various embodiments, it is also contemplated that the tank 70 comprises an agitator to circulate fluid and any associated additives or solids.

The tank 70 and associated pump 74 are provided to convey fluid to one more zones 60, 62, 64, 66 of the racks 2a, 2b. A plurality of conduits 76 is provided to transmit the fluid from the tank and pump 74 to the zones or racks. In preferred embodiments, at least portions of the conduits 76 comprise flexible conduits to accommodate for movement of the racks 2a, 2b and generally provide for greater ease of use of the system. The conduit(s) 76 preferably comprise solenoid valves 80 to selectively control and restrict fluid flow to various regions of the system. Although various embodiments of the present disclosure contemplate the use of solenoid valves, it will be recognized that various alternative valves including, but not limited to, manually-operated valves may be provided to regulate fluid flow within the conduit 76. A control unit 72 is provided in communication with the tank 70 and/or pump 74. In certain embodiments, the control unit 72 comprises one or more commercially available irrigation and propagation systems useful for activating fluid-dispensing and irrigation operations at desired times, for example. Specifically, the control unit 72 of the preferred embodiment comprises programmable logic to selectively activate solenoids within the system and dispense desired amounts of liquid at desired moments in time to desired regions of the system. The control unit 72 of the present disclosure further comprises various monitoring features for sensing system parameters and displaying information related to the same to a user. For example, the control unit 72 may be provided in communication with one or more sensors in the tank 70 to display information related to a volume of fluid remaining in the tank 70, for example. In preferred embodiments, the control unit 72 comprises a programmable unit such that at least one of frequency (waterings per week or day), duration, volume, and location (zone) may be programmed into the control unit 72 and the irrigation system 68 provides fluid to plants associated with the system at automatic desired intervals. The control unit 72 is preferably provided in communication with at least one of the pump 74 and one or more solenoid valves 80 within the conduit 76 to provide irrigation in a desired frequency, manner, duration, etc. and as will be recognized by one of skill in the art.

As shown in FIG. 10, a plurality of watering zones 60, 62, 64, 66 are provided. In certain embodiments, zones are provided to separate the system into smaller and more manageable segments and to enable a desired water pressure within the zone(s). Providing fluid to a large number of plants or a large number of zones or areas will reduce the fluid pressure at each individual plant or zone. Accordingly, the present disclosure contemplates providing fluid to a limited number of zones or plants at a time in order to obtain a desired fluid pressure at each zone or plant while minimizing the required pump power. It is further contemplated that a plurality of irrigation zones 60, 62, 64, 66 are provided and that one or more of the zones comprises unique irrigation needs. For example, plants provided in a first zone 60 may require different irrigation activity than another zone 66 provided within the same system. Such conditions may occur where plants of different type or maturity are being grown and cultivated within the same system. The present disclosure thus provides systems wherein individual zones may be established and a control unit 72 of the system is operable to automatically provide irrigation to specific zones and wherein at least two zones of the system are provided with different irrigation activities including at least one of frequency of irrigation, volume of fluid received, type of fluid received, etc.

While various embodiments of the disclosed device have been described in detail, it is apparent that modifications and alterations of those embodiments will occur to those skilled in the art. However, it is to be expressly understood that such modifications and alterations are within the scope and spirit of the present disclosure, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion has been presented for purposes of illustration and description. The foregoing is not intended to limit the disclosure to the form or forms disclosed herein. In the foregoing description for example, various features of the disclosure have been identified. It should be appreciated that these features may be combined together into a single embodiment or in various other combinations as appropriate. The dimensions of the component pieces may also vary, yet still be within the scope of the disclosure. Moreover, though the description has included description of one or more embodiments and certain variations and modifications, other variations and modifications are within the scope of the disclosure, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present disclosure, in various embodiments, includes components, methods, processes, systems and/or apparatus substantially as depicted and described herein, including various embodiments, subcombinations, and subsets thereof. Those of skill in the art will understand how to make and use the devices of the disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the following claims reflect, inventive aspects lie in less than all features of any single foregoing disclosed embodiment.

The invention claimed is:

1. A system for cultivating a plurality of plants, the system comprising:
a first moveable rack, the first movable rack comprising a plurality of storage units adapted to receive plants distributed in at least a vertical orientation, and wherein the first moveable rack is provided in communication with a floor track and the first moveable rack is moveable in a direction defined by the floor track;
at least one vertically elongate lighting element secured to an elongate track extending from and moveable with the first rack, wherein a position of the vertically elongate lighting element is moveable relative to the elongate track and the first moveable rack, and the vertically elongate lighting element is operable to provide at least one of light and heat;
a second rack comprising a plurality of storage units adapted to receive plants, the second rack comprising a stationary rack; and
wherein a relative position of the second rack and the lighting element is adjustable by adjusting the position of the vertically elongate lighting element relative to the elongate horizontal track.

2. The system of claim 1, wherein the first moveable rack comprises a plurality of storage units arranged in adjacent rows and columns on a first side, and a plurality of storage units arranged in adjacent rows and columns on a second side.

3. The system of claim 1, wherein at least one of the storage units comprises a shelf.

4. The system of claim 1, wherein the at least one vertically elongate lighting element is a plurality of vertically elongate lighting elements.

5. The system of claim 2, wherein the at least one vertically elongate lighting element comprises two vertically elongate lighting elements, one of the two vertically elongate lighting elements is provided proximal the first side of the first rack and the other of the two vertically elongate lighting elements is provided proximal the second side of the first rack.

6. The system of claim 1, wherein the first moveable rack comprises at least one wheel operable for travel at least partially within the floor track.

7. A system for cultivating a plurality of plants, the system comprising:
a first moveable rack, the first movable rack comprising a plurality of storage units adapted to receive plants distributed in at least a vertical orientation, and wherein the first moveable rack is provided in communication with a floor track and the first moveable rack is moveable in a direction defined by the floor track;
a vertically elongate lighting element, wherein the vertically elongate lighting element is secured to and moveable with the first moveable rack, wherein a position of the vertically elongate lighting element is also moveable relative to the first moveable rack, wherein the vertically elongate lighting element is secured to an elongate horizontal track extending from the first rack;
a second rack comprising a plurality of storage units adapted to receive plants, the second rack comprising a stationary rack such that the second rack is not moveable; and
wherein a relative position of the second rack and the lighting element is adjustable by moving at least one of the first moveable rack and the vertically elongate lighting element.

8. The system of claim 7, wherein at least one of the storage units comprises a shelf.

9. The system of claim 7, further comprising a fluid supply conduit in fluid communication with each of said storage units and a fluid return conduit operable to convey fluid from the storage units.

10. The system of claim 7, further comprising an irrigation system comprising a pump, a fluid storage tank, a plurality of conduits, and a control unit, wherein the control unit selectively activates a plurality of solenoids within the irrigation system to dispense a desired amount of a liquid stored in the fluid storage tank at a desired moment in time to a desired region of the irrigation system.

11. The system of claim 7, wherein the vertically elongate lighting element comprises a plurality of LED lights.

12. A system for cultivating plants, the system comprising:
a first rack having a height, a width, and a depth, the first rack adapted to receive a plurality of plants distributed along at least the height and the width;
a second rack having a height, a width, and a depth, the second rack comprising a wheel adapted for contact with a floor track and wherein the second rack is moveable in a first direction along a path defined by the floor track, the floor track extending substantially perpendicular to the height and the width of the second rack;
the second rack comprising at least one vertically elongate lighting element for providing at least one of light and heat; wherein at least one of the vertically elongate lighting elements is mounted to a horizontally extending elongate track that is secured to and moveable with the second moveable rack, wherein a position of the at least one vertically elongate lighting element mounted to the respective elongate track is moveable relative to the elongate track and wherein a proximity between the first rack and the lighting element is adjustable by movement of the second rack in the direction defined by the floor track;
a third rack having a height, a width, and a depth, the third rack adapted to receive a plurality of plants distributed along at least the height and the width;
the third rack comprising a wheel adapted for contact with the floor track and moveable along a path defined by the floor track; and
wherein the first rack comprises a stationary rack that is not moveable.

13. The system of claim 12, wherein the second rack comprises a first side and a second side opposing the first side, the first and second sides separated by the width.

14. The system of claim 12, wherein the third rack comprises another of the at least one vertically elongate lighting elements, and wherein a proximity of the vertically elongate lighting element of the third rack rack and the second rack is selectively adjustable by moving the third rack.

15. The system of claim 12, wherein at least one of the first rack, the second rack and the third rack comprises an irrigation system.

16. The system of claim 12, further comprising a fourth rack adapted to receive a plurality of plants.

17. The system of claim 12, wherein the second rack comprises a user-interface for selective movement of the second rack.

18. The system of claim 12, wherein the at least one vertically elongate lighting element comprises a plurality of vertically elongate lighting elements, wherein each of the vertically elongate lighting elements is secured to a respective horizontal elongate track; and wherein each of the vertically elongate lighting elements is operable to be provided at different distances relative to the first rack.

19. The system of claim 12, wherein at least the first rack comprises a plurality of shelves.

20. The system of claim 12, wherein each vertically elongate lighting element comprises a plurality of LED lights.

\* \* \* \* \*